United States Patent
Hong et al.

(10) Patent No.: US 11,415,405 B2
(45) Date of Patent: Aug. 16, 2022

(54) STRAIN GAUGE HAVING UNBALANCED BIAS FOR SINGLE SIDED APPLICATIONS

(71) Applicant: STMicroelectronics Asia Pacific Pte Ltd, Singapore (SG)

(72) Inventors: Sa Hyang Hong, Seoul (KP); Jun Hwan Kang, Seoul (KP); Yun Sang On, Hwasung (KP)

(73) Assignee: STMicroelectronics Asia Pacific Ptd Ltd, Singapore (SG)

( * ) Notice: Subject to any disclaimer, the term of this patent is extended or adjusted under 35 U.S.C. 154(b) by 145 days.

(21) Appl. No.: 16/858,110

(22) Filed: Apr. 24, 2020

(65) Prior Publication Data

US 2021/0333085 A1    Oct. 28, 2021

(51) Int. Cl.
*G06F 3/041* (2006.01)
*G01B 7/16* (2006.01)
*G01L 1/22* (2006.01)

(52) U.S. Cl.
CPC ............. *G01B 7/18* (2013.01); *G01L 1/2287* (2013.01); *G06F 3/04144* (2019.05); *G06F 2203/04105* (2013.01)

(58) Field of Classification Search
CPC ............. G01L 1/2287; G06F 3/04144; G06F 2203/04105; G01B 7/18
See application file for complete search history.

(56) References Cited

U.S. PATENT DOCUMENTS

| | | | |
|---|---|---|---|
| 8,988,384 B2 | 3/2015 | Krah et al. | |
| 10,088,937 B2 | 10/2018 | Hoen et al. | |
| 10,353,506 B2 | 7/2019 | Vosgueritchian et al. | |
| 10,528,174 B2 | 1/2020 | Kim et al. | |
| 2016/0377501 A1* | 12/2016 | Agarwal | G01L 1/2281 73/1.15 |
| 2018/0260065 A1* | 9/2018 | Huang | G09G 3/20 |
| 2018/0365466 A1 | 12/2018 | Shim et al. | |
| 2019/0178730 A1* | 6/2019 | Lee | H01L 41/125 |
| 2021/0088365 A1* | 3/2021 | Louwagie | G01D 18/00 |

FOREIGN PATENT DOCUMENTS

| | | |
|---|---|---|
| KR | 1020190126953 A | 11/2019 |
| WO | 2018164415 A1 | 9/2018 |

\* cited by examiner

*Primary Examiner* — Towfiq Elahi
(74) *Attorney, Agent, or Firm* — Crowe & Dunlevy

(57) ABSTRACT

Disclosed herein is a strain gauge including a substrate, with a first Wheatstone bridge arrangement of resistors disposed on a first surface of the substrate, and a second Wheatstone bridge arrangement of resistors disposed remotely from the first Wheatstone bridge arrangement of resistors. The resistors of the first Wheatstone bridge arrangement are equal in resistance to one another, while the resistors of the second Wheatstone bridge arrangement are unequal in resistance to one another and unequal to those of the first Wheatstone bridge arrangement. The first Wheatstone bridge arrangement of resistors are electrically connected in parallel with the second Wheatstone bridge arrangement of resistors such that each resistor of the first Wheatstone bridge arrangement is electrically connected in parallel with a different resistor of the second Wheatstone bridge arrangement.

14 Claims, 2 Drawing Sheets

STRAIN GAUGE HAVING UNBALANCED BIAS FOR SINGLE SIDED APPLICATIONS

TECHNICAL FIELD

This disclosure is related to the field of strain gauge sensors, and in particular, to a strain gauge sensor for use in a single sided application. This strain gauge sensor utilizes an unbalanced bias, as opposed to a common balanced Wheatstone bridge, to as to enable use in these single sided applications.

BACKGROUND

Touch screens are widely utilized in smartphones, smartwatches, tablets, and laptops. A touch screen is typically formed in layers, with a display layer (for displaying content and prompts for user input) overlaid by a touch matrix which uses capacitive sensing to receive said user input.

In some instances, it may be desired for a certain area of the touch screen to be sensitive to not only touch itself, but also to the pressure of the touch. This may be used, for example, to provide for a "virtual" home button, without the requirement of a physical button that would consume area on the top face of the device that could otherwise be occupied by the touch screen. To facilitate this functionality, strain gauges may be incorporated within such touch screens.

A sample dual sided strain gauge 2 is shown in FIG. 1A, where it can be seen that the dual sided strain gauge 2 has subcomponents 4 (resistors 4a and 4b) and 5 (resistors 5a and 5b) positioned on opposite sides of a test specimen 3 (which could be any suitable substrate, such as a layer within the touch screen). As shown in FIG. 1B, the dual sided strain gauge 2 itself is comprised of resistors 4a, 4b, 5a, and 5b configured in a Wheatstone bridge. The strain gauge 2 is coupled between a supply voltage VCC and ground. When force is applied to top side of the test specimen 3 in a downward direction, the test specimen 3 flexes so the resistors 4a, 4b, 5a, and 5b flex, but the strain, stress, or tension on the resistors 4a and 4b (disposed on the top side of the test specimen 3) changes with respect to the strain, stress, or compression on the resistors 5a and 5b (disposed on the bottom side of the test specimen 3). As a result, the resistance of the resistors 4a and 4b changes with respect to the resistance of the resistors 5a and 5b. By measuring the difference between the voltages Vp and Vn produced by the output taps of the dual sided strain gauge 2, the direction of the force applied to the test specimen 3 as well as the magnitude of that force can be determined.

This dual sided strain gauge 2 is useful for some applications. However, for other applications, it may be desired to have a single sided strain gauge 2', as shown in FIGS. 2A-2B. Here, it can be seen that the single sided strain gauge 2' has subcomponents 4 (resistors 4a and 4b) and 5 (resistors 5a and 5b) both on the top or same side of the test specimen. The issue here, however, is that when a force is applied to the test specimen 3, since the resistors 4a, 4b, 5a, and 5b are all on the same side of the test specimen 3, the stress on the resistors 4a, 4b, 5a, and 5b does not change much with respect to one another. The differential signal (difference between the voltages Vp and Vn) is therefore negligible. As such, the single sided strain gauge 2' does not provide suitable results in many situations.

Therefore, further development is needed.

SUMMARY

Disclosed herein is a strain gauge including: a substrate; a first Wheatstone bridge arrangement of resistors disposed on a first surface of the substrate, the resistors of the first Wheatstone bridge arrangement being equal in resistance; and a second Wheatstone bridge arrangement of resistors, some of the resistors of the second Wheatstone bridge arrangement being unequal in resistance to one another, and being unequal in resistance to the resistors of the first Wheatstone bridge arrangement of resistors; wherein the first Wheatstone bridge arrangement of resistors are electrically connected in parallel with the second Wheatstone bridge arrangement of resistors such that each resistor of the first Wheatstone bridge arrangement is electrically connected in parallel with a different resistor of the second Wheatstone bridge arrangement.

The resistors of the first Wheatstone bridge arrangement may be physically arranged successively next to one another along a longitudinal axis of the substrate.

The first Wheatstone bridge arrangement of resistors may include: a first resistor coupled between a first node and a fourth node; a second resistor coupled between the first node and a second node; a third resistor coupled between a third node and the fourth node; and a fourth resistor coupled between the second node and the third node.

The second Wheatstone bridge arrangement of resistors may include: a fifth resistor coupled between the first node and the fourth node; a sixth resistor coupled between the first node and the second node; a seventh resistor coupled between the third node and the fourth node; and an eighth resistor coupled between the second node and the third node.

An output of the strain gauge may be a voltage differential between potentials at the second node and the fourth node.

The first node may be connected to a supply voltage and the third node may be connected to ground.

The second Wheatstone bridge arrangement of resistors may be remotely located from the first Wheatstone bridge arrangement of resistors.

In some instances, the second Wheatstone bridge arrangement off resistors is not disposed on or in the substrate.

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein.

Figure 1A:
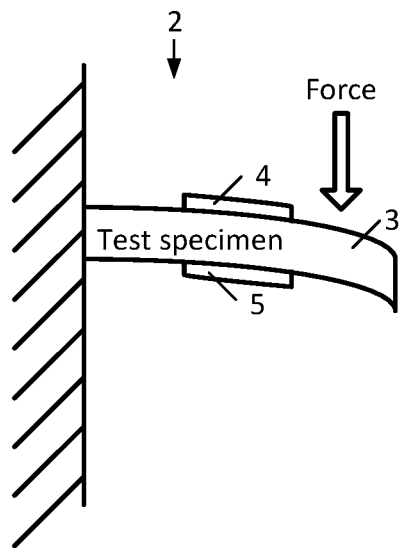
FIG. 1A is a side view of a prior art dual sided strain gauge.
Figure 1B:
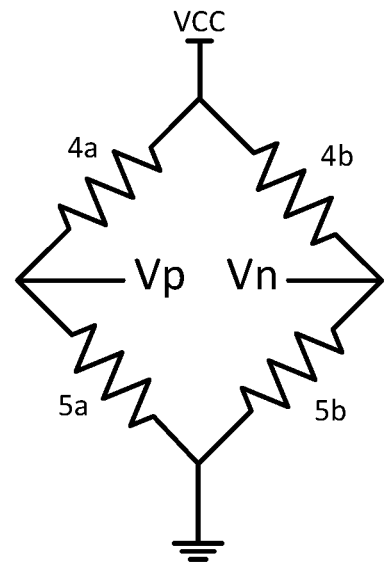
FIG. 1B is an electrical schematic of the prior art dual sided strain gauge of FIG. 1A.
Figure 2A:
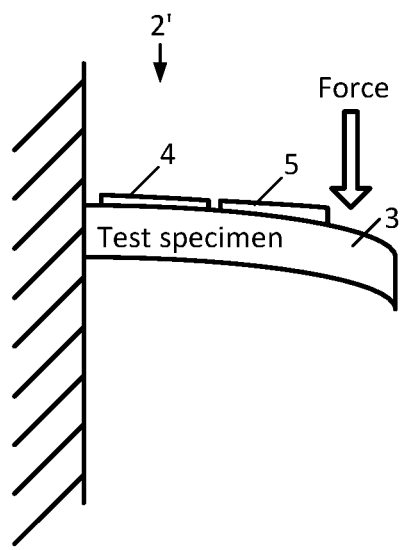
FIG. 2A is a side view of a single sided strain gauge disclosed herein.
Figure 2B:
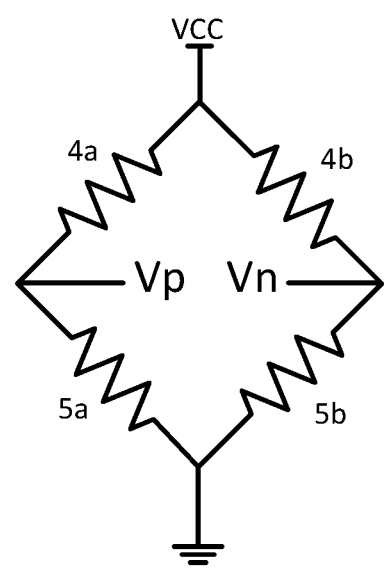
FIG. 2B is an electrical schematic of the single sided strain gauge of FIG. 2A.
Figure 3A:
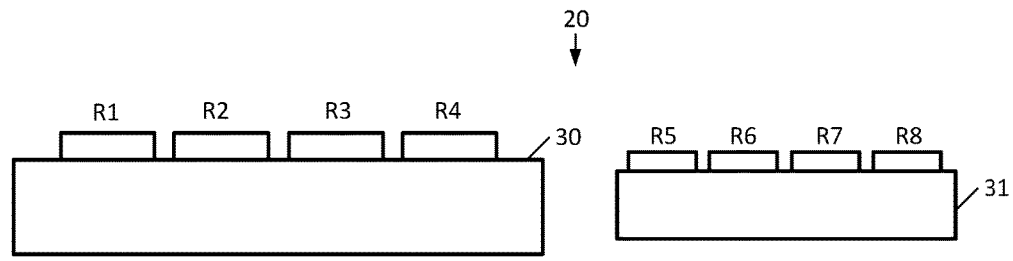
FIG. 3A is a side view of a double sided strain gauge disclosed herein at rest.
Figure 3B:
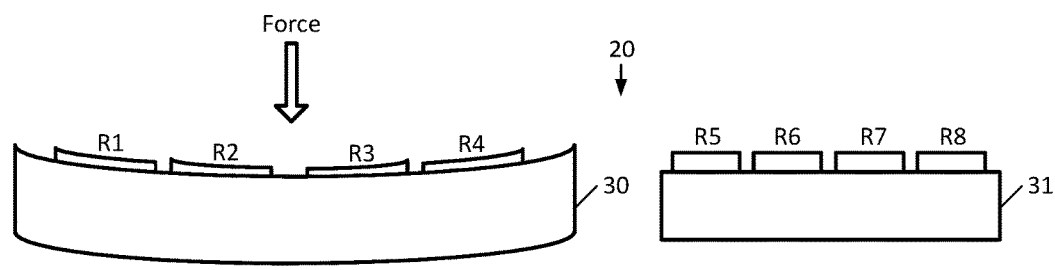
FIG. 3B is a side view of a double sided strain gauge disclosed herein when under stress.
Figure 4:
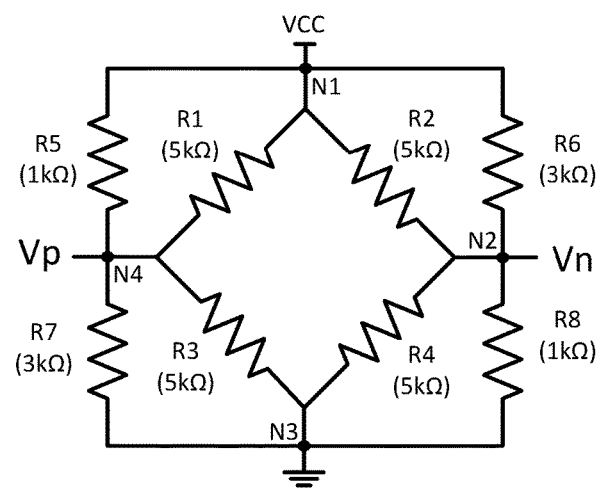
FIG. 4 is an electrical schematic of the double sided strain gauge of FIGS. 3A-3B.

Now described with reference to FIGS. 3A-4 is a single sided strain gauge 20 disclosed herein. The single sided strain gauge 20 is comprised of four resistors R1-R1 disposed on a top surface of a substrate 30, with an additional four resistors R5-R8 disposed on in an area 31 (such as a layer within a touch screen device, a main board of an electronic device, etc.) remotely located from the resistors R1-R4 and their substrate 30.

The electrical connections of the resistors R1-R8 with respect to one another can be seen in FIG. 4. Resistors R1-R4 are arranged into a balanced Wheatstone bridge arrangement, with resistor R1 being connected between nodes N1 and N4, resistor R2 being connected between nodes N1 and N2, resistor R4 being connected between nodes N2 and N3, and resistor R3 being connected between nodes N3 and N4. Note that resistors R1-R4 each have a same resistance (in the absence of strain applied to the traces forming those resistors), which in this example is 5 kΩ. Node N1 is connected to VCC, and node N3 is connected to ground.

So as to avoid the scenario where the stresses and deformations on the resistors R1-R4 are generally equivalent to one another when a force is applied to the substrate 20, resistors R5-R8 are arranged into an unbalanced Wheatstone bridge arrangement that is connected in parallel with the balanced Wheatstone bridge arrangement of resistors R1-R4, with resistor R5 connected between nodes N1 and N4, resistor R6 connected between nodes N1 and N2, resistor R8 connected between nodes N2 and N3, and resistor R7 connected between nodes N3 and N4. Note that while resistors R5 and R8 have first resistances (here, 1 kΩ), resistors R6 and R7 have second resistances (here, 3 kΩ), making the second Wheatstone bridge unbalanced, as stated.

Each resistor R1-R8 is a separate physical component from one another, formed such as by wire traces.

This arrangement described above means that resistor R1 is connected in parallel with resistor R5, resistor R2 is connected in parallel with resistor R6, resistor R4 is connected in parallel with resistor R8, and resistor R3 is connected in parallel with resistor R7. This means that the parallel resistance of R1 and R5 (which here would be 833.333Ω) is different than the parallel resistance of R2 and R6 (which here would be 1875Ω); likewise, the parallel resistance of R3 and R7 (which here would be 1875Ω) is different than the parallel resistance of R4 and R8 (which here would be 833.333Ω).

The result of this is that when force is applied to the substrate 30, as shown in FIG. 3B, a differential voltage will appear across Vp and Vn, unlike as in the prior art.

For example, in a prior art arrangement where R1-R4 each have the same resistance and resistors R5-R8 are not present, due to the resistors R1-R4 having the same resistance, the voltage difference between Vp and Vn in such a prior art arrangement is negligible. However, with the design of the single sided strain gauge 20, the voltage difference between Vp and Vn when force is applied to the substrate 30 is about 0.53 uV, because there is a difference in resistance between the parallel combination of R1 and R5 and the parallel combination of R2 and R6; likewise, there is a difference in resistance between the parallel combination of R3 and R7 and the parallel combination of R4 and R8. Moreover, note that, as described hereinabove, in the strain gauge 20, the resistors R5-R8 are remotely located from the resistors R1-R4 so that they do not experience the same strain forces. For this reason, the resistors R5-R8 are separate and discrete components from resistors R1-R4, and an unbalanced Wheatstone bridge arrangement where resistors R1-R2 have different resistances from one another and where resistors R3-R4 have different resistances from one another, and without the remotely located resistors R5-R8, would not function.

As such, the single sided strain gauge 20 is functional, providing enough differential voltage between Vp and Vn to enable accurate and precise operation.

R1, R2, R3, R4 is referring physical strain gauge sensor while R5, R6, R7, R8 is external resistor where placed different location from strain gauge sensor to avoid common strain force. If we just replace different value of R1-R4, It will have a common variation between Vp and Vn when there is force pressure and we can't get voltage difference between Vp and Vn.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A strain gauge, comprising:
a substrate;
a first Wheatstone bridge arrangement of resistors disposed on a first surface of the substrate, the resistors of the first Wheatstone bridge arrangement being equal in resistance;
wherein the first Wheatstone bridge arrangement of resistors comprises:
a first resistor coupled between a first node and a fourth node;
a second resistor coupled between the first node and a second node;
a third resistor coupled between a third node and the fourth node; and
a fourth resistor coupled between the second node and the third node; and
a second Wheatstone bridge arrangement of resistors, some of the resistors of the second Wheatstone bridge arrangement being unequal in resistance to one another, and being unequal in resistance to the resistors of the first Wheatstone bridge arrangement of resistors;
wherein the second Wheatstone bridge arrangement of resistors comprises:
a fifth resistor coupled between the first node and the fourth node;
a sixth resistor coupled between the first node and the second node;
a seventh resistor coupled between the third node and the fourth node; and
an eighth resistor coupled between the second node and the third node;
wherein the first Wheatstone bridge arrangement of resistors are electrically connected in parallel with the second Wheatstone bridge arrangement of resistors such that each resistor of the first Wheatstone bridge arrangement is electrically connected in parallel with a different resistor of the second Wheatstone bridge arrangement.

2. The strain gauge of claim 1, wherein the resistors of the first and second Wheatstone bridge arrangements are physically arranged successively next to one another along a longitudinal axis of the substrate.

3. The strain gauge of claim 1, wherein an output of the strain gauge is a voltage differential between potentials at the second node and the fourth node.

4. The strain gauge of claim 1, wherein the first node is connected to a supply voltage and the third node is connected to ground.

5. The strain gauge of claim 1, wherein the second Wheatstone bridge arrangement of resistors is remotely located from the first Wheatstone bridge arrangement of resistors.

6. The strain gauge of claim 1, wherein the second Wheatstone bridge arrangement off resistors is not disposed on or in the substrate.

7. A method of measuring strain on a substrate due to force applied to the substrate, the method comprising:
applying a supply voltage and a ground voltage across a pair of parallel connected Wheatstone bridge resistor arrangements, a first of the pair of Wheatstone bridge resistor arrangements being disposed on a first surface of the substrate and comprising a first resistor coupled between a first node and a fourth node, a second resistor coupled between the first node and a second node, a third resistor coupled between a third node and the fourth node, and a fourth resistor coupled between the second node and the third node;
applying the force to the substrate; and
measuring a differential voltage across output nodes of the pair of parallel connected Wheatstone bridge resistor arrangements present because the resistors of the first of the pair of Wheatstone bridge resistor arrangements are equal in resistance while some of the resistors of a second of the pair of Wheatstone bridge resistor arrangements are unequal in resistance, the second of the pair of Wheatstone bridge arrangements comprising a fifth resistor coupled between the first node and the fourth node, a sixth resistor coupled between the first node and the second node, a seventh resistor coupled between the third node and the fourth node, and an eighth resistor coupled between the second node and the third node.

8. The method of claim 7, further comprising, prior to application of the supply voltage and the ground voltage across the pair of parallel connected Wheatstone bridge resistor arrangements, physically arranging the resistors of the first Wheatstone bridge resistor arrangement successively next to one another along a longitudinal axis of the substrate.

9. An electronic device, comprising:
a substrate;
a first Wheatstone bridge arrangement of resistors disposed on a first surface of the substrate, the resistors of the first Wheatstone bridge arrangement being equal in resistance;
wherein the first Wheatstone bridge arrangement of resistors comprises:
a first resistor coupled between a first node and a fourth node;
a second resistor coupled between the first node and a second node;
a third resistor coupled between a third node and the fourth node; and
a fourth resistor coupled between the second node and the third node; and
a second Wheatstone bridge arrangement of resistors disposed on a component remotely located from the substrate, some of the resistors of the second Wheatstone bridge arrangement being unequal in resistance to one another, and being unequal in resistance to the resistors of the first Wheatstone bridge arrangement of resistors;
wherein the second Wheatstone bridge arrangement of resistors comprises:
a fifth resistor coupled between the first node and the fourth node;
a sixth resistor coupled between the first node and the second node;
a seventh resistor coupled between the third node and the fourth node; and
an eighth resistor coupled between the second node and the third node;
wherein the first Wheatstone bridge arrangement of resistors are electrically connected in parallel with the second Wheatstone bridge arrangement of resistors such that each resistor of the first Wheatstone bridge arrangement is electrically connected in parallel with a different resistor of the second Wheatstone bridge arrangement.

10. The electronic device of claim 9, wherein the component comprises an electronic board.

11. The electronic device of claim 9, wherein the component comprises a layer within a touch screen.

12. The electronic of claim 9, wherein the resistors of the first and second Wheatstone bridge arrangements are physically arranged successively next to one another along a longitudinal axis of the substrate.

13. The electronic device of claim 9, wherein an output of the electronic device is a voltage differential between potentials at the second node and the fourth node.

14. The electronic device of claim 9, wherein the first node is connected to a supply voltage and the third node is connected to ground.

* * * * *